United States Patent Office 3,579,586
Patented May 18, 1971

3,579,586
PROCESS FOR THE PREPARATION OF THE DEXTROROTATORY 2,2' - (ETHYLENE-DI-IMINO)-DI-1-BUTANOL
Giorgio Zoja, Milan, Italy, assignor to Laboratorio Chimico Farmaceutico Giorgio Zoja S.p.A., Milan, Italy
No Drawing. Filed Nov. 13, 1968, Ser. No. 775,508
Claims priority, application Germany, June 5, 1968, P 17 68 612.3
Int. Cl. C07c 89/04
U.S. Cl. 260—584R                    7 Claims

ABSTRACT OF THE DISCLOSURE

A process for the production of highly pure, levoisomer free, (+) 2,2-ethylenediimino-di-1-butanol dihydrochloride involving resolution of (±) 2-amino-1-butanol (+) tartrates with boiling methanol, reaction of (+) 2-amino-1-butanol with ethylene dichloride and precipitating the intermediate product with gaseous hydrochloric acid to obtain the desired product.

---

The present invention refers to an industrial process for the preparation of highly pure, pharmaceutically suitable dextrorotatory 2,2' - (ethylenediimino)-d-1-butanol dihydrochloride with high yields.

The compound 2,2'-(ethylenediimino)-di-1-butanol dihydrochloride of formula:

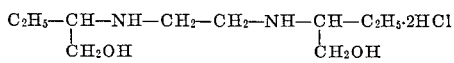

is known. This compound may exist in two optical antipodes, the levorotatory and the dextrorotatory form and also meso-form and racemic mixture. It is also known that of the stereoisomers the dextro-form is endowed with antitubercular activity higher that that of the meso and levo-form, this latter being inactive at the maximum tolerated dose. Moreover the dextro-form is quite devoid of unpleasant side effects.

At this time there exist a lot of pharmacological and clinical tests demonstrating the great activity against tubercular affections of dextrorotatory 2,2'-(ethylenediimino)-di-1-butanol, as well as the fact that this dextroform must be quite pure, and in particular free of levoform, to avoid obnoxious side-effects due to the levorotatory product.

All this premised, it is evident how desirable it was to find a method suitable to produce with industrial yields the highly pure dextrorotatory 2,2'-(ethylenediimino)-di-1-butanol dihydrochloride. However up today no such method had been found, but only methods were known through which was prepared the racemic mixture of said compounds, from which it was impossible to separate the dextro-form, and therefore of no utility in the pharmaceutical field. Pure dextro-form could be obtained only starting from pure (+)2-amino-1-butanol, through a resolution process, giving so low yields to be considered as a laboratorium process, rather than an industrial one.

For the sake of simplicity, we will indicate in what follows with (+) the dextrorotatory forms, with (−) the levorotatory forms and with (±) the racemic mixtures.

More precisely it was known from J.A.C.S., 83, (1961) that (+)2,2'-(ethylenediimino)-di - 1 - butanol was prepared by reaction of the (+) 2-amino-1-butanol with dichloro ethane; the (+)2-amino-1-butanol being obtained from (±)2-amino-butanol by the tartrate resolution procedure of Radke, J.A.C.S., 76, 2801.

However the (+)2,2'-ethylenediimino-di-1-butanol so prepared (owing to the fact that Radke only obtains the pure (−)2-amino-1-butanol), occurs with such low yields as to render impossible to industrially use this method while, the more, the product so obtained is still impure by the meso 2,2'-(ethylenediimino)-di-1-butanol and by the (±)2,2'-(ethylenediimino)-di-1-butanol.

As a consequence, neither the difficulties in the preparation process, nor the impurity of the final pharmaceuticle product, with respect to the processes starting from the racemic 2-amino-1-butanol, are avoided.

We have now found a new process, which leads to the (+)2,2'-(ethylenediimino)-di-1-butanol dihydrochloride through a few, simple steps, easily performed on industrial scale with high yields; the more, it leads to a highly pure product, which may be immediately utilized for pharmaceutical purposes, being in particular quite free from meso-form and levo-form.

The new process is essentially based on the following surprising facts found by the applicant. As a matter of fact the applicant has found that, inexplicably, while the (−)2-amino-1-butanol (+)hydrogen tartrate and the (+)2-amino-1-butanol (+)hydrogen tartrate are nearly equally soluble in absolute ethyl alcohol, and while the (+)2-amino-1-butanol (+)hydrogen tartrate is more soluble than the (−)2-amino-1-butanol (+)hydrogen tartrate in an ethanol-water mixture containing 95% ethanol, if methyl alcohol is used, the (−)2-amino-1-butanol (+)hydrogen tartrate is dissolved while the (+)2-amino-1-butanol (+)hydrogen tartrate is only slightly solubilized.

When account is taken of the closeness in the behaviour of ethyl alcohol and methyl alcohol, in particular with respect to the solvent power, it is immediately evident how unexpected is what found by the applicant.

Particularly surprising and of decisive importance for the process of the invention is the fact found by the applicant that, while the solubility of (+)2-amino-1-butanol (+)hydrogen tartrate in methyl alcohol varies only so slightly from room temperature to the boiling temperature of the solvent that this compound can be considered in any case very sparingly soluble, the solubility of the (−) 2-amino-1-butanol (+)hydrogen tartrate which is moderate at room temperature, increases so markedly at the solvent boiling temperature that the product and the solvent become practically miscible in every ratio, thus allowing an easy, quick and perfect separation, impossible under any other condition known up today. We have said that the anomalous behaviour found by the applicant for the solubility of the diastereoisomer amino-butanol hydrogen tartrates in methyl alcohol at different temperatures has been of decisive importance for the process of the present invention, since really the separation of these diastereoisomers with boiling methanol is by far more simple and economical, and thus industrial, than with methanol at room temperature.

Further the applicant has found that there exist some critical conditions under which the preparation of (+) 2,2'-ethylenediimino-di-1-butanol dihydrochloride from (+)2-amino-1-butanol and ethylene dichloride and, above all, its separation from the reaction mixture takes place in a quite easy and simple manner particularly suitable for an industrial process.

Essentially the next process, object of the present invention, comprises the following steps:

(a) Equimolecular amounts of racemic 2-amino-1-butanol and (+)tartaric acid are made to react in aqueous solution, the amount of water being in the ratio of 0.8–1.2: 1 with respect to the total weight of the reactants present. Thereafter the solution is cooled at 0–10° C. under vigorous stirring; a substantial amount of the (−)2-amino-1-butanol (+)hydrogen tartrate precipitates and is removed by filtration or by centrifugation.

(b) The aqueous solution is concentrated by heating under vacuum, in one or more steps, until its volume is reduced to 3.4 times the volume of the initially used aminobutanol; one or more fractions, prevailingly consisting of (+)2-amino-1-butanol (+)hydrogen tartrate, precipitate by cooling to 0°–10° C. under vigorous stirring. These fractions, after drying, are treated with boiling, anhydrous methyl alcohol in the ratio of 0.5–0.8 in volumes by weight of treated product. The boiling solution is discarded and the residue is treated again with boiling methyl alcohol in the ratio V:W of 0.1–0.3. The insoluble product is separated from the boiling solution and washed with methanol. A highly pure (+)2-amino-1-butanol (+) hydrogen tartrate is obtained with yields ranging from 60 to 70%.

(c) The thus obtained, highly pure (+)2-amino-1-butanol (+)hydrogen tartrate is dissolved in water, preferably in a ratio of 1 part by weight of salt in 2 parts of water, and in this solution the (+)2-amino-1-butanol is set free from the tartaric acid through any suitable process, for example by means of an anion-exchange resin.

Of course also the pure (−)2-amino-1-butanol can be obtained with the same method.

(d) 2 moles of the highly pure (+)2-amino-1-butanol and 1 mole of ethylene dichloride are dissolved in a suitable organic solvent and refluxed at temperatures nearly comprised between 100° and 130° C. for a few hours. The reaction is strongly exothermic. At the end of the reaction, the solution is saturated with gaseous hydrochloric acid, while cooling and stirring, up to complete precipitation of (+)2,2'-(ethylenediimino)-di-1-butanol dihydrochloride.

The precipitate is washed with the same solvent of reaction and then recrystallized.

The yields in this second step of the process according to the invention are between 45 and 55%.

By suitable solvent, a solvent is meant which dissolves the (+)2-amino-1-butanol and the ethylene dichloride, while does not dissolve the (+)2,2'-(ethylenediimino)-di-1-butanol dihydrochloride, and with a boiling point comprised between 100° and 130° C.

The most suitable solvent which we have found up to new is butanol.

Also this step of the reaction, under the peculiar conditions found by the applicant, is extremely easy and simple to perform.

(e) From the mother liquors, the unreacted (+)2-amino-1-butanol is recovered by first distilling the excess HCl and ethylene dichloride and then setting free the amino-butanol from its hydrochloride with 60% aqueous NaOH under vigorous stirring. The (+)2-amino-1-butanol is distilled under reduced pressure from the organic layer and recycled.

The following example has the purpose of more clearly illustrating the present invention, without however limiting the same.

EXAMPLE

To a solution of 98 kg. of (+)tartaric acid in 130 litres of water, 58 kg. of racemic 2-amino-1-butanol are added.

After cooling up to 3° C., under vigorous stirring, 49 kg. of (−)2-amino-1-butanol (+)hydrogen tartrate precipitate, which are removed by centrifugation. The volume of the aqueous solution is reduced to $10/17$ of its value by concentration under reduced pressure. The solution is then cooled to 3° C. under vigorous stirring; a crystalline fraction prevailingly constituted of (+)2-amino-1-butanol (+)hydrogen tartrate precipitates and is collected by centrifugation. The aqueous solution is again concentrated under reduced pressure to $10/17$ of its volume, cooled to 3° C. under vigorous stirring and a second crop of crystals prevailingly consisting of (+)2-amino-1-butanol (+)hydrogen tartrate is collected by centrifugation.

The two fractions collected are dried and intimately admixed with 100 l. of anhydrous boiling methanol.

The boiling methanolic solution is removed and substituted with further 30 litres of anhydrous boiling methanol. After admixing and separation of the boiling solution, 15 litres of fresh, anhydrous, boiling methanol are added. After intimately admixing, the mixture is cooled and filtered at room temperature.

49 kg. of (+)2-amino-1-butanol (+)hydrogen tartrate are so obtained, with a M.P. of 140–141° C. and a $[\alpha]_D^{22} = 23.5°$ (c. 12, H$_2$O). To obtain the (+)2-amino-1-butanol from the pure (+)2-amino-1-butanol (+)hydrogen tartrate, 18 kg. of this latter compounds are dissolved in 36 l. of water and the solution is percolated through Kastel A-300 resin. The resin is then washed with water collecting the aqueous eluate until the pH is reduced to about 8.

The aqueous solution was concentrated under reduced pressure, in order to eliminate as much water as possible, and the residue was then distilled under vacuum. In this manner 6.6 kg. of (+)2-amino-1-butanol are obtained, $[\alpha]_D^{31} = +9.3°$.

The (−)2-amino-1-butanol is obtained in analogous manner 18 kg. of highly pure (+)2-amino-1-butanol, 9.2 kg. of ethylene dichloride, and 35 kg. butanol are admixed and refluxed for 2 hours. It is necessary to use a large condenser to dissipate the heat abruptly developed at the starting of the reaction.

After this time, the solution is saturated with gaseous hydrogen chloride. The (+)2,2'-ethylenediimino-di-1-butanol dihydrochloride precipitates, is filtered, washed with little amounts of butanol and recrystallized.

10 kg. of highly pure (+)2,2'-ethylenediimino-di-1-butanol dihydrochloride are thus obtained. M.P. 202° C.; $[\alpha]_D^{28} = +7.4°$ (c. 27.7, H$_2$O). 6 kg. of unreacted (+)2-amino-1-butanol, still present in the butanolic solution, are recovered by distilling off the excess of HCl and ethylene dichloride, slowly adding aqueous 60% NaOH in little excess on the stoichiometric amount and distilling under reduced pressure the organic layer.

The yield of (+)2,2'-ethylenediimino-di-1-butanol dihydrochloride with respect to the effectively consumed (+)2-amino-1-butanol is of 53.6%.

I claim:

1. A process for the preparation of (+)2,2'-ethylenediimino-di-1-butanol dihydrochloride, particularly free of the levo-isomer, characterized in that an aqueous mixture of (+)2-amino-1-butanol and (−)2-amino-1-butanol is reacted with about an equal molecular amount of (+)tartaric acid, separated by fractional crystallization of the hydrogen tartrate diastereoisomers by purifying the fractions rich in (+)2-amino-1-butanol (+)hydrogen tartrate with boiling methyl alcohol, separating pure (+)2-amino-1-butanol from the tartrate, reacting one mol of (+)2-amino-1-butanol with 0.25 to 1 mol of ethylene dichloride in the presence of an inert organic solvent at a temperature of between 100 and 130° C., and precipitating said highly pure (+)2,2'-ethylenediimino-di-1-butanol dihydrochloride by saturating the solution with gaseous hydrochloric acid.

2. The process according to claim 1, wherein the weight of water contained in said aqueous solution of (+)tartaric acid to which said 2-amino-1-butanol stereoisomers are added and the weight of total reagents is in a ratio between 0.8 and 1.2.

3. The process according to claim 2, characterized by crystallizing a substantial portion of (−)2-amino-1-butanol (+)hydrogen tartrate by cooling said aqueous solution with stirring at a temperature between 0 and 10° C.

4. The process according to claim 3, characterized by concentrating in one or more steps, the fraction rich in (+)2-amino-1-butanol (+)hydrogen tartrate in the mother liquors under reduced pressure up to about 3.4 times the initial volume of 2-amino-1-butanol and cooling at a temperature between 1 and 10° C. while stirring vigorously.

5. The process according to claim 4, characterized in that the fraction rich in (+)2-amino-1-butanol (+)hydrogen tartrate is purified by mixing with boiling methyl alcohol in two successive steps wherein the volume of methyl alcohol is in a ratio with respect to the weight of said treated crystals respectively between 0.5 and 0.8 and 0.1 to 0.3.

6. The process according to claim 1, characterized in that said (+)2-amino-1-butanol is reacted with ethylene dichloride in the presence of an organic solvent having a boiling point between 100° and 130° C., a high dissolution power for the reactants and a limited one for said (+)2,2'-ethylene diimino-di-1-butanol hydrochloride.

7. The process according to claim 6, wherein said organic solvent is butanol.

References Cited
UNITED STATES PATENTS

| | | | |
|---|---|---|---|
| 3,116,332 | 12/1963 | Sullivan | 260—584 |
| 3,401,194 | 9/1968 | Zoja | 260—584X |

CHARLES B. PARKER, Primary Examiner

R. L. RAYMOND, Assistant Examiner